Oct. 13, 1931.          A. F. CONNERY ET AL          1,826,737
        METHOD OF AND MEANS FOR BALANCING TELEGRAPH LINES
                        Filed Aug. 8, 1930
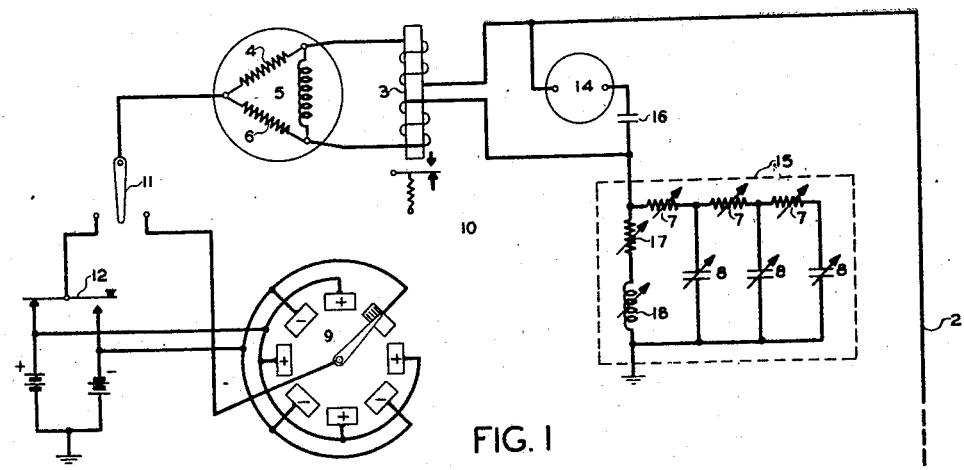
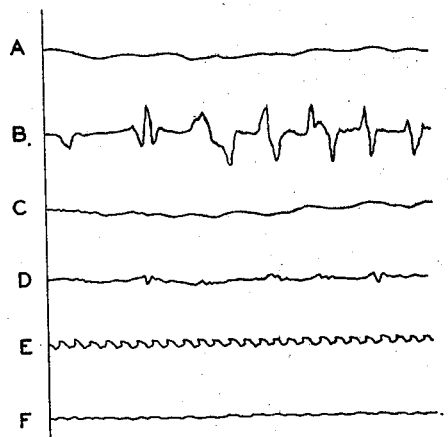
FIG. 2
INVENTOR
ALDER F. CONNERY
RONALD S. WISHART
BY
ATTORNEY Patented Oct. 13, 1931

1,826,737

UNITED STATES PATENT OFFICE

ALDER F. CONNERY, OF BROOKLYN, AND RONALD S. WISHART, OF ROCKVILLE CENTER, NEW YORK, ASSIGNORS TO INTERNATIONAL COMMUNICATIONS LABORATORIES, INC., OF NEW YORK, N. Y., A CORPORATION OF NEW YORK

METHOD OF AND MEANS FOR BALANCING TELEGRAPH LINES

Application filed August 8, 1930. Serial No. 473,884.

This invention relates to communication systems and more particularly to a system for determining the degree of balance between a line and an artificial line.

As is well known in the art, a balance must be maintained between a real line and an artificial line in order that reception of signals over a duplex telegraph circuit may be undisturbed. The artificial line is made up of a plurality of variable resistances to balance the resistance of the line and a plurality of variable condensers with variable resistances in series with them, to balance the capacity of the line. There also may be in the artificial line one or more fixed condensers with or without resistances in series with them. In some cases there may be either a fixed or variable inductance inserted in the artificial line. The artificial line is thus constructed to contain within its limits of variation some combination of resistance, timed capacity and inductance which will closely simulate the real line which it is to balance.

The real or main line conditions vary with weather and changes in wires. In order to keep the artificial line and real line in a state state of balance some means must be provided for indicating the amount of current in each, the difference between them indicating the amount of resistance unbalance. In addition, some method must be provided to indicate the capacity unbalance between the two.

Under certain conditions the effect of lump inductances in the line varies due to leakage to ground along a conductor. This condition makes it difficult to obtain a true capacity balance. In order to overcome this feature it has been found possible to match the inductance in the real line with a variable inductance in the artificial line.

In a copending application Serial No. 465,228 filed July 1, 1930 by us is described a new method of ascertaining a capacity unbalance by using a meter responsive to A. C. current which indicates the induction on the line and the degree of capacity unbalance. Under conditions in which there is a large amount of inductance in the line it is difficult to obtain a correct capacity unbalance.

It is, therefore, the principal object of this invention to provide means whereby the inductance of the real line may be matched to facilitate the balancing of the capacity thereof.

A clearer conception of the operation, details and further objects of this system may be had from the following description, taken in conjunction with the accompanying drawings in which:—

Figure 1 discloses the circuit employing the invention.

Fig. 2 is a series of graphs showing the relation of the currents in an unbalanced system.

Fig. 1 discloses a station 10 connected to a line or cable 2. A polarized line relay 3 is connected to the real line 2 through one of its windings and thence to winding 4 of a differential D. C. milliammeter 5. The winding 6 of the milliammeter is connected through the other winding of relay 3 to the artificial line 15 which is composed of variable condensers 8, variable resistances 7, a large variable resistance 17 and a variable inductance 18. The apex of meter 5 is connected to a two-point switch 11, one point of which is connected to a key 12 adapted to contact with positive or negative battery. The second point of switch 11 connects with a motor driven commutator 9 which provides A. C. current of a frequency within the signal range of the line. It may be a specially provided commutator or it may be a portion of the usual distributor.

A highly air-damped galvanometer 14 is bridged in series with a condenser 16 across the line 2 and the artificial line 15. It has not been thought necessary to disclose the galvanometer 14 in detail as it may be of any well known make though specially designed to meet the requirements of this circuit, comprising a rotatable armature positioned between two laminated pole pieces. Secured to the armature is a pointer which is maintained in a zero position by a retractile spring.

The condenser 16 is provided to prevent the flow of direct current through the meter 14 while balancing, and eliminates the necessity of having the distant station ground the line while a balance is being taken. The value of the capacity is such that in conjunction with the inductance and resistance of the meter, A. C. frequencies from zero to 450 cycles will not be seriously impeded.

The use of the A. C. commutator 9 having a frequency preferably within the signaling range sets up a condition which assimilates actual signaling conditions and the A. C. meter indicates the difference between the value and phase relation of the capacity and inductive kicks in the artificial line and the main line, thereby indicating the degree of unbalance.

The procedure in balancing a circuit is to move the switch 11 to the left and the key 12 is slowly operated and resistance 17 is adjusted until the needle of meter 5 gives equal readings with the key open and closed. This is called a resistance balance and is well known in the art.

A reading is now taken on the A. C. balance indicator 14 and note is made of the deflection which is due to the induction in the main line. Assuming that the scale of this meter is calibrated from 0 to 20 milliamperes in two milliamperes divisions, the reading due to induction may be assumed to be from 4 to 6 milliamperes.

The switch 11 is now moved to the right and the commutator 9 is started and a reading is again taken on indicator 14 which is an indication of unbalance due to capacity, plus the amount of induction. This may be 18 milliamperes. Condensers 8 and retardation resistances 7 are now adjusted until the indicator reads between 4 and 6 at which point the line is in a state of balance.

It is sometimes found that the balance cannot be reduced to the value of the induction 4 and 6 and that the best possible balance is several milliamperes above the induction value. This is due to the effect of the impedance of the windings of the distant terminal duplex relays, the margin of unbalance being greater the larger the impedance. This is also sometimes due to lump inductances occurring in the line wire itself, as in the case of intermediate composite telephone equipment.

In the above description, the frequency of the A. C. applied to the split of the duplex has been stated as preferably within the signaling range of the circuit. When inductance exists to a noticeable extent in the communication circuit, and if not compensated for or matched in the artificial line, a balance obtained with an A. C. frequency equal to the maximum frequency of operation of the circuit may not be satisfactory for the lower frequencies, and vice versa. A relation of frequencies in operation may be from five to thirty cycles per second, for instance. If the inductance on the line is low and the variable timing resistances are manipulated, the indicator of meter 14 will very nearly approach the induction reading which was noted, namely, from 4 to 6 milliamperes. If, however, the inductance of the line is very high the resistances and condensers may be adjusted until the meter reads, for example, 10 milliamperes. Any further manipulation of the condensers will cause the needle to move up again, indicating that the inductance is high.

At this point the variable inductance 18 may be adjusted to match the inductance in the real line. This is done by first adjusting the variable inductance 18 and then the resistances 7 and condensers 8 until the meter 14 gives a reading as near the induction value as possible.

Fig. 2 discloses a series of oscillograms in which A indicates the induction in a certain line, B a condition of unbalance and C a condition of balance. D represents another condition of unbalance due to wrong adjustment of timing resistances. It will be noted that C does not exactly duplicate A. This is due to the fact that it is almost impossible to obtain an absolutely perfect balance.

Graph E indicates the effect on a balance of inductance in a line caused by a certain type of terminal relay. Graph F indicates the effect of another type of terminal relay. It will be seen from these graphs that high inductance will greatly affect the curve C to such an extent that it will be impossible to approximate curve A. If, however, the inductance in the artificial line is varied to match the inductance in the real line, the disturbance in E will approach F and a more perfect balance may be obtained.

It is obvious from the foregoing that the method outlined is not limited in its use to obtaining a balance on the forms of networks described, but can be used in conjunction with other types of networks.

What is claimed is:

1. In a telegraph system, a real line, an artifical line containing a variable inductance, a polarized relay, a differential D. C. milliammeter connected to said lines through said relay and to a two-point switch, a key connected to one of the points of said switch, positive and negative battery under the control of said key, a commutator to provide A. C. current at a frequency within the signaling range and under the control of the other point of said switch, and galvanometer and a condenser bridged across said lines.

2. In a telegraph system, the method of eliminating a state of unbalance between a real line and its artificial line consisting in ascertaining the resistance unbalance, correcting such unbalance, ascertaining the induction on the line, impressing alternating current on said lines, to ascertain the state of capacity unbalance therein, and then correcting said capacity unbalance by varying the inductance and capacity in said artifical line.

3. In a communication system, a method of balancing two lines comprising alternately impressing current of opposite polarity on said lines, taking a reading of resistance unbalance therebetween, adjusting the resistance in one of said lines until a resistance balance is obtained, taking a reading of the induction in said lines, impressing alternating current on said lines of a frequency within the signaling range, taking a second reading indicating the induction and capacity unbalance, adjusting the line to eliminate the capacity unbalance, and varying the inductance in one of said lines until the induction and capacity reading approximates the induction reading.

4. In a communication system, the method of eliminating a state of capacity unbalance between a real line and its artificial line, said artificial line having variable capacity and inductance therein, comprising taking a reading indicating the induction on said real line, impressing alternating current on said lines of a frequency within the signaling range, taking a second reading indicating the inductance and capacity unbalance, and then adjusting the capacity and inductance to approximate said first reading.

5. In a telegraph system, a method of eliminating a state of unbalance between a real line and its artificial line consisting in ascertaining the resistance unbalance, correcting such unbalance, ascertaining the induction on the line, impressing alternating current of a frequency within the signaling range on said lines, to ascertain the state of capacity unbalance therein, and then correcting said capacity unbalance by varying the inductance and capacity in said artificial line.

In witness whereof, we hereunto subscribe our names this 4th day of August, 1930.

ALDER F. CONNERY.
RONALD S. WISHART.